(12) United States Patent
Ootani

(10) Patent No.: US 11,577,411 B2
(45) Date of Patent: Feb. 14, 2023

(54) BOOT SEAL, ROBOT, AND PARALLEL LINK ROBOT

(71) Applicant: FANUC CORPORATION, Yamanashi (JP)

(72) Inventor: Kentarou Ootani, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 385 days.

(21) Appl. No.: 16/809,912

(22) Filed: Mar. 5, 2020

(65) Prior Publication Data
US 2020/0338760 A1    Oct. 29, 2020

(30) Foreign Application Priority Data
Apr. 24, 2019   (JP) .............................. JP2019-083052

(51) Int. Cl.
| | | |
|---|---|---|
| B25J 19/00 | (2006.01) | |
| F16J 15/52 | (2006.01) | |
| B25J 9/00 | (2006.01) | |
| F16C 11/06 | (2006.01) | |

(52) U.S. Cl.
CPC ......... *B25J 19/0075* (2013.01); *B25J 9/0054* (2013.01); *F16C 11/0671* (2013.01); *F16J 15/52* (2013.01)

(58) Field of Classification Search
CPC .......................... B25J 17/0275; B25J 17/0266; B25J 19/0075; B25J 9/0054; F16C 11/0671
See application file for complete search history.

(56) References Cited

U.S. PATENT DOCUMENTS

| | | | | |
|---|---|---|---|---|
| 1,434,610 | A | * | 11/1922 | Gunn .................... B62D 7/16 403/51 |
| 4,813,913 | A | | 3/1989 | Belter |
| 5,222,746 | A | * | 6/1993 | Van Steenbrugge .... F16J 3/045 403/50 |

(Continued)

FOREIGN PATENT DOCUMENTS

| | | |
|---|---|---|
| EP | 0 543 011 A1 | 5/1993 |
| JP | S50-028134 U | 4/1975 |

(Continued)

OTHER PUBLICATIONS

Notice of Reasons for Refusal dated Jul. 13, 2021 in corresponding Japanese Application No. 2019-083052; 11 pages including English-language translation.

*Primary Examiner* — Jake Cook
(74) *Attorney, Agent, or Firm* — Maier & Maier, PLLC

(57) ABSTRACT

A boot seal is detachably attached to a joint including: a drive link and link members; and a ball joint for linking them to be relatively rotatable or swivelable. The ball joint includes a ball shank having a shaft section fixed to the drive link and a ball section provided on one end of the shaft section and a holder that is fixed to an end section of each of the link members and that has a ball-receiving section for supporting the ball section in a state where the ball section is surrounded. A cover main body that covers the gap between the ball shank and the holder and that is formed of a flexible material includes through-holes through which the shaft section is made to pass, a slit that continuously extends between the through-holes, and a fastener opening and hermetically closing the slit along the entire length thereof.

10 Claims, 8 Drawing Sheets

(56) References Cited

U.S. PATENT DOCUMENTS

| | | | |
|---|---|---|---|
| 5,431,601 A | 7/1995 | Nakamura | |
| 7,641,562 B2* | 1/2010 | Nakamura | F16D 3/845 403/381 |
| 10,018,228 B2* | 7/2018 | Innocenzi | F16J 3/045 |
| 10,036,427 B2* | 7/2018 | Marquez | F16D 3/845 |
| 2004/0066994 A1* | 4/2004 | Reddehase | B60G 21/0551 384/192 |
| 2009/0097908 A1 | 4/2009 | Asa et al. | |
| 2009/0211390 A1 | 8/2009 | Brogardh et al. | |
| 2013/0022299 A1 | 1/2013 | Voisine et al. | |
| 2014/0083232 A1 | 3/2014 | Go | |
| 2016/0114330 A1 | 4/2016 | Roper | |

FOREIGN PATENT DOCUMENTS

| | | | |
|---|---|---|---|
| JP | S58-002154 U | | 1/1983 |
| JP | S62-013823 A | | 1/1987 |
| JP | 03107611 A | * | 5/1991 |
| JP | H04-362377 A | | 12/1992 |
| JP | H10-318369 A | | 12/1998 |
| JP | 2001-012450 A | | 1/2001 |
| JP | 2009-097547 A | | 5/2009 |
| JP | 2013-177980 A | | 9/2013 |
| JP | 2014-046406 A | | 3/2014 |
| JP | 2014-523509 A | | 9/2014 |
| JP | 2016-520002 A | | 7/2016 |
| WO | 2008/055918 A2 | | 5/2008 |
| WO | 2013/013005 A1 | | 1/2013 |
| WO | 2014/0186821 A1 | | 11/2014 |

* cited by examiner

BOOT SEAL, ROBOT, AND PARALLEL LINK ROBOT

CROSS-REFERENCE TO RELATED APPLICATIONS

This application is based on Japanese Patent Application No. 2019-083052, the content of which is incorporated herein by reference.

FIELD

The present invention relates to a boot seal, a robot, and a parallel link robot.

BACKGROUND

There are well-known ball joints for swivelably connecting drive links and passive links (refer to, for example, Japanese Unexamined Patent Application, Publication No. 2001-12450). The ball joint in Japanese Unexamined Patent Application, Publication No. 2001-12450 includes: a ball shank having a ball section at one end of a shaft section; a holder that has a ball-receiving section for supporting the ball section in a state in which the ball-receiving section surrounds the ball section and that is linked to the ball shank so as to be relatively swivelable or rotatable; and a boot seal that hermetically seals the gap between the ball shank and the holder and that is formed of a cylindrical elastomer.

The boot seal hermetically seals, from the outside, the boundary between the ball section of the ball shank and the ball-receiving section of the holder. By doing so, it is possible not only to prevent dust and moisture from entering the gap between the ball section and the ball-receiving section from the outside but also to hold, in the boot seal, a lubricant, such as grease, that is supplied to the gap between the ball section and the ball-receiving section.

SUMMARY

One aspect of the present disclosure is directed to a boot seal that is detachably attached to a robot joint including: a first joint member and a second joint member; and a ball joint for linking the first joint member and the second joint member so as to be relatively rotatable or relatively swivelable, wherein the ball joint includes a ball shank having a shaft section fixed to the first joint member and a ball section provided at one end of the shaft section and a holder that is fixed to an end section of the second joint member and that has a ball-receiving section for supporting the ball section in a state in which the ball-receiving section surrounds the ball section, and the boot seal includes a cover main body that is formed of a flexible material and that covers a gap between the ball shank and the holder, the cover main body including a first through-hole through which the shaft section is made to pass, a second through-hole through which the shaft section or the second joint member is made to pass, a slit that continuously extends between the first through-hole and the second through-hole and that can be opened and closed, and an opening/closing member for opening and hermetically closing the slit along an entire length thereof.

DETAILED DESCRIPTION

A boot cover and a parallel link robot (robot) according to one embodiment of the present disclosure will now be described with reference to the drawings.

Figure 1:
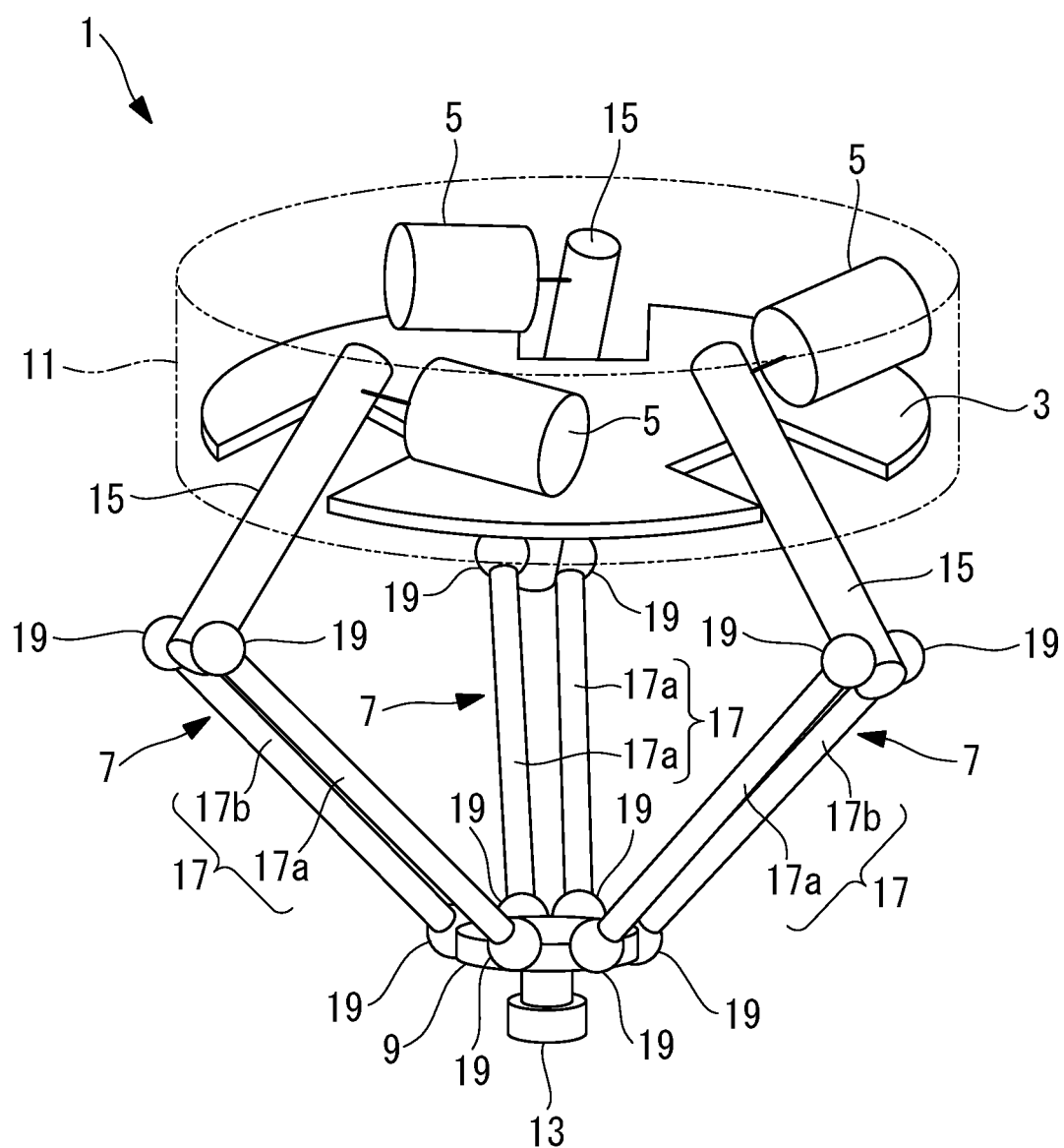
FIG. 1 is a perspective view showing a parallel link robot according to one embodiment of the present disclosure.

As shown in FIG. 1, a parallel link robot 1 according to this embodiment includes: a base part (base) 3 to which a plurality of (e.g., three) actuators 5 are attached; three arms 7 that are linked to the respective actuators 5; and a movable plate (first joint member, end part) 9 to which the leading ends of the arms 7 are connected. In FIG. 1, reference sign 11 denotes a housing for housing the base part 3, and reference sign 13 denotes a wrist shaft that is attached to the movable plate 9 so as to be rotatable about a rotation axis in a substantially vertical direction.

The base part 3 is formed of a disc-shaped member arranged substantially horizontally. In order to avoid coming into contact with the three arms 7, the base part 3 is shaped by cutting three substantially rectangular section out of a circular plate.

Each of the actuators 5 is arranged on the base part 3. Each of the actuators 5 swivels the corresponding arm 7 linked thereto about a horizontal axial line along the disc-shaped plane direction of the base part 3. By swiveling each of the arms 7 about the horizontal axial line by means of the corresponding actuator 5, the movable plate 9 can be translated while the orientation thereof is kept parallel to the base part 3.

The arms 7 are arranged at equal intervals in the circumferential direction surrounding the vertical axial line at the center of the disc-shaped base part 3. Each of the arms 7 includes: a drive link (first joint member) 15 driven by the corresponding actuator 5; and a passive link (second joint member) 17 disposed at the position at which the drive link 15 and the movable plate 9 are connected.

The passive link 17 includes two cylindrical link members 17a and 17b that are parallel to each other. The drive link 15 and each of the link members 17a and 17b are connected via a ball joint (joint) 19 so as to be swivelable, and each of the link members 17a and 17b and the movable plate 9 are connected via a ball joint 19 so as to be swivelable.

Figure 2:
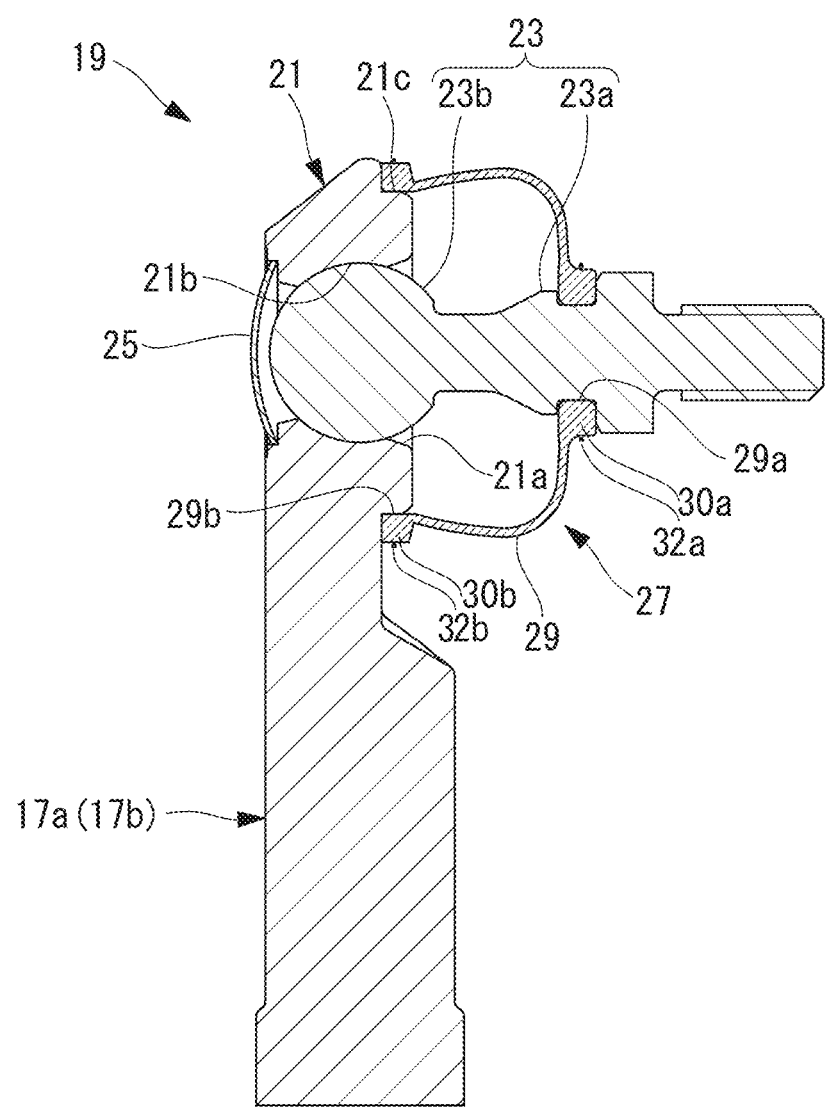
FIG. 2 is a longitudinal sectional view showing a ball joint and a boot seal in FIG. 1.
Figure 3:
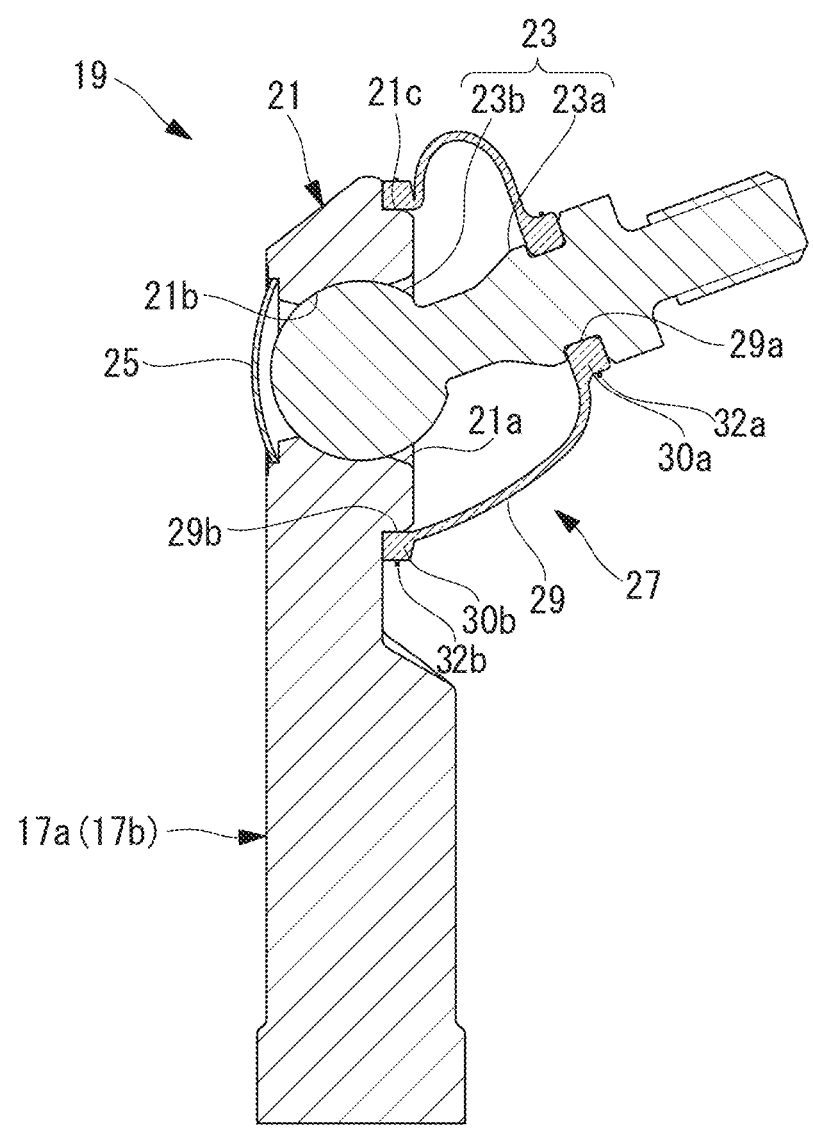
FIG. 3 is a longitudinal sectional view seen when the ball joint in FIG. 2 is swiveled.

As shown in FIGS. 2 and 3, each of the ball joints 19 includes: a holder 21 fixed to an end of the link member 17a or 17b; and a ball shank 23 fixed to the drive link 15 or the movable plate 9.

The ball shank 23 has: a shaft section 23a having a male thread; and a ball section 23b provided at one end of the shaft section 23a.

Figure 4:
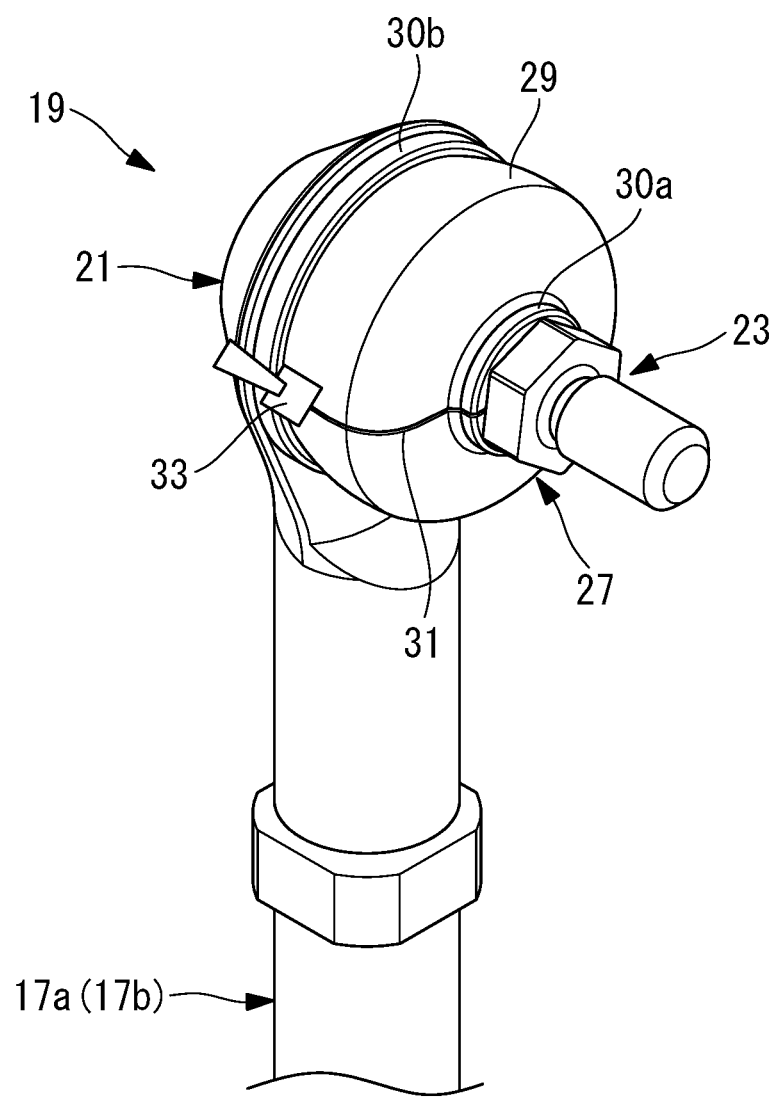
FIG. 4 is a perspective view showing a state in which the boot seal is attached to the ball joint.
Figure 5:
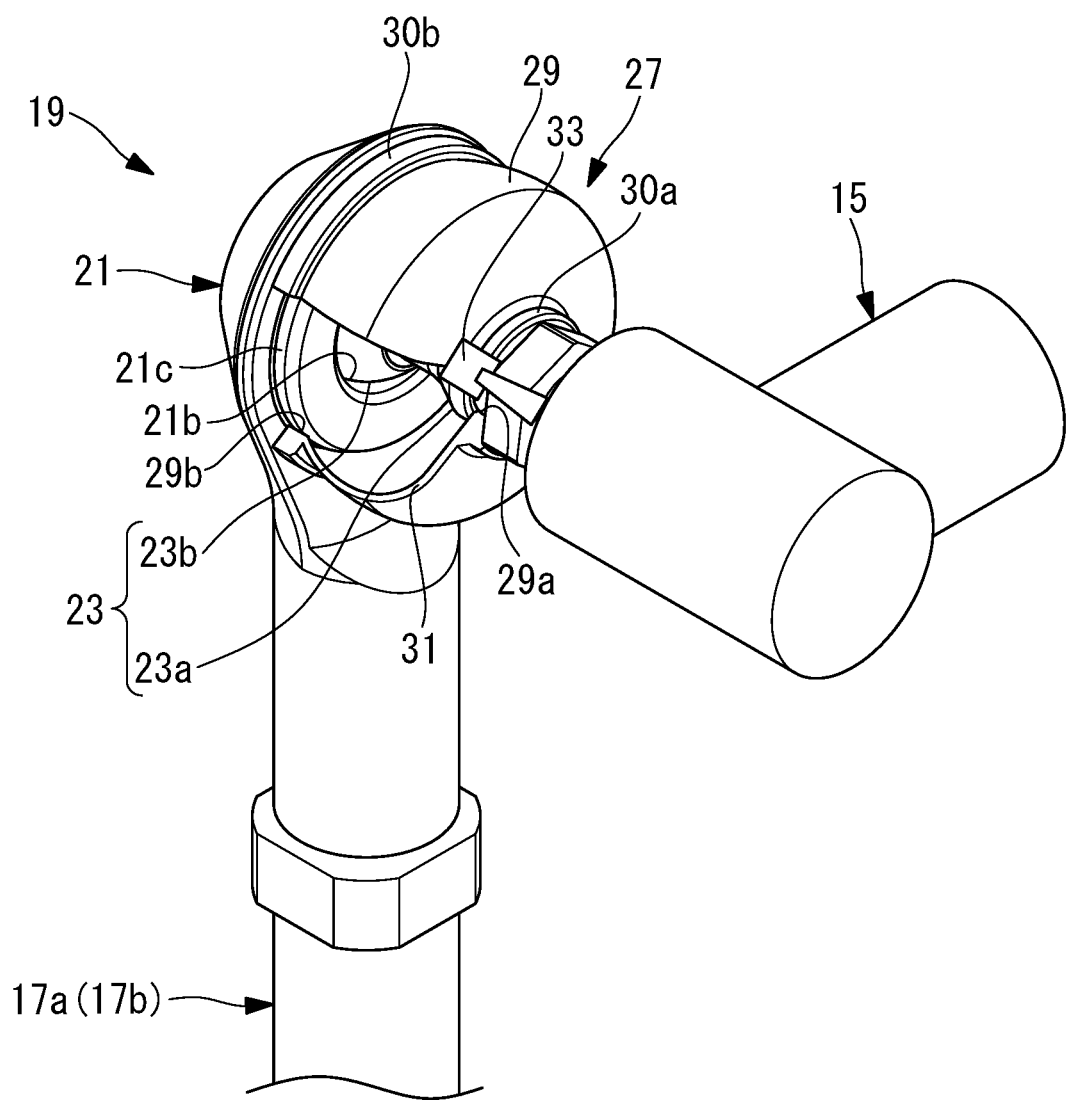
FIG. 5 is a perspective view showing a state in which a slit of the boot seal in FIG. 4 is open.
Figure 6:
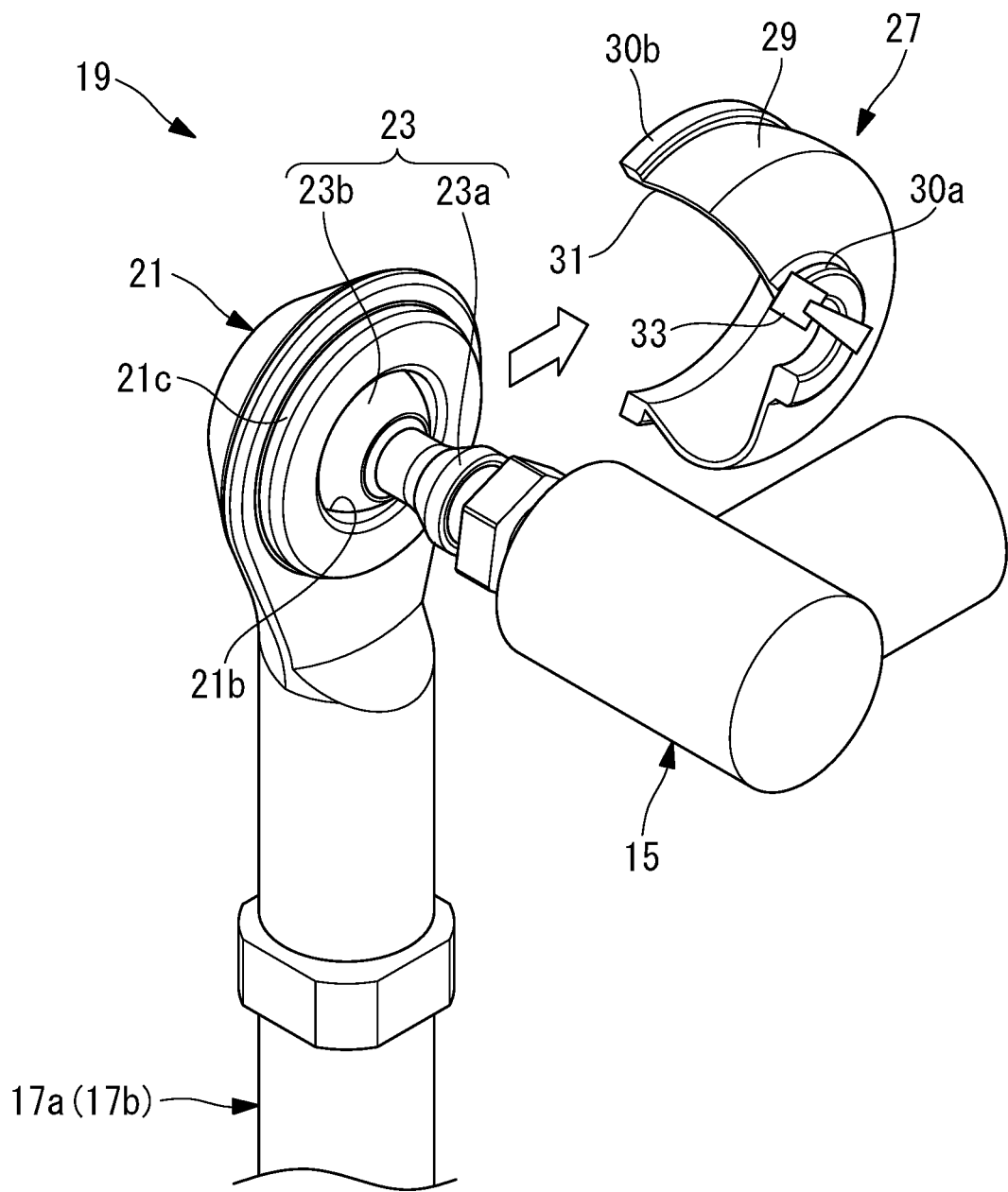
FIG. 6 is a perspective view showing a state in which the boot seal is removed from the ball joint.

As shown in FIGS. 4 to 6, the holder 21 is formed into a disc shape by inflating the end of the link member 17a or 17b. As shown in FIGS. 2 and 3, the holder 21 has, at the center of the disc, a holder through-hole 21a passing through the disc in the plate thickness direction. A ball-receiving section 21b that supports the ball section 23b of the ball shank 23 in a state in which the ball-receiving section 21b surrounds the ball section 23b and that is formed by an inner spherical surface is provided in the holder through-hole 21a.

In other words, the link member 17a or 17b extending in the radial direction of the holder 21 is connected to the holder 21 at one location in the circumferential direction thereof. Furthermore, the ball shank 23, which is swivelable or rotatable about the center point of the ball section 23b in a state in which the ball section 23b is housed in the ball-receiving section 21b, extends in the axial direction of the holder 21.

In addition, the holder 21 has a ring-shaped stepped section 21c that is formed as a result of the entire circumference of the opening of the holder through-hole 21a protruding in the board thickness direction of the holder 21, the shaft section 23a of the ball shank 23 protruding from the opening of the holder through-hole 21a. The stepped section 21c has an outer diameter larger than the outer diameter of the shaft section 23a of the ball shank 23. In the holder through-hole 21a, the opening on the opposite side from the opening from which the shaft section 23a of the ball shank 23 protrudes is covered with a disc-shaped cover member 25.

A boot seal 27 is detachably attached to each of the ball joints 19.

As shown in FIGS. 2 to 4, the boot seal 27 includes a ring-shaped cover main body 29 for covering the gap between the ball shank 23 of the ball joint 19 and the holder 21.

The cover main body 29 is formed of a flexible material, such as rubber, resin, or waterproof cloth. The cover main body 29 includes: a first end section 30a having a first through-hole 29a that opens at one end in the axial direction; and a second end section 30b having a second through-hole 29b that opens at the other end in the axial direction.

The hole diameter of the first through-hole 29a is set to be smaller than the hole diameter of the second through-hole 29b. The cover main body 29 is shaped so as to become gradually narrower as a result of being curved inwardly in the radial direction from an intermediate position towards the first through-hole 29a in the axial direction.

The first through-hole 29a is arranged on the shaft section 23a of the ball shank 23 in a state in which the shaft section 23a of the ball shank 23 passes through the first through-hole 29a. The gap between the first through-hole 29a and the shaft section 23a is hermetically closed as a result of the first end section 30a being pressed from outside against the shaft section 23a along the entire circumference of the first end section 30a by means of a hermetically closing member 32a (hermetically closing member for the first through-hole), such as a binding band or a wire.

The second through-hole 29b is arranged on the stepped section 21c of the holder 21 in a state in which the shaft section 23a of the ball shank 23 passes through the second through-hole 29b. The gap between the second through-hole 29b and the stepped section 21c is hermetically closed as a result of the second end section 30b being pressed from outside against the stepped section 21c of the holder 21 along the entire circumference of the second end section 30b by means of a hermetically closing member similar to the hermetically closing member for hermetically closing the first through-hole 29a.

In addition, the boot seal 27 includes: a slit 31 that extends from the first through-hole 29a to the second through-hole 29b and that can be opened and closed; and a fastener (opening/closing member) 33 that can open and hermetically close the slit 31 along the entire length of the slit 31.

The fastener 33 is, for example, a wire fastener and can close the slit 31 in a water-tight state by meshing a plurality of teeth arranged along the slit 31 with one another and open the slit 31 by separating the teeth from one another. The fastener 33 is welded to the slit 31, for example, through ultrasound welding.

In a state in which the slit 31 is closed by means of the fastener 33, the boot seal 27 is formed in a ring shape in which the first through-hole 29a thereof opens at one end in the axial direction and the second through-hole 29b thereof opens at the other end in the axial direction. When the slit 31 is opened by means of the fastener 33, a single large opening is formed as a result of the first through-hole 29a being connected to the second through-hole 29b.

Next, the operation of the boot seal 27 and the parallel link robot 1 according to this embodiment will be described below.

As shown in FIGS. 2 and 4, according to the boot seal 27 with the above-described configuration, the gap between the ball shank 23 and the holder 21 of each of the ball joints 19 is covered with the cover main body 29 in a state in which the slit 31 is hermetically closed by means of the fastener 33. The gap between the first through-hole 29a and the shaft section 23a and the gap between the second through-hole 29b and the stepped section 21c are hermetically closed by the respective hermetically closing members (not shown in the figure).

As shown in FIG. 3, as a result of the slit 31 being closed by means of the fastener 33, it is possible to prevent the slit 31 from being opened even if the cover main body 29 formed of a flexible material is bent due to relative swiveling between the drive link 15 or the movable plate 9 and the passive link 17. The same advantage is also afforded even if the cover main body 29 is twisted due to relative rotation between the drive link 15 or the movable plate 9 and the passive link 17.

By doing so, it is possible not only to secure water tightness of the gap between the ball shank 23 and the holder 21 but also to prevent the entry of dust and moisture from outside into the gap between the ball section 23b of the ball shank 23 and the ball-receiving section 21b of the holder 21. Furthermore, it is also possible to reliably prevent the outflow of abrasion powder resulting from friction between the ball section 23b and the ball-receiving section 21b. Furthermore, it is possible to hold, in the boot seal 27, a lubricant, such as grease, that is supplied to the gap between the ball section 23b and the ball-receiving section 21b.

When the boot seal 27 is to be replaced, first the hermetically closing members hermetically closing the first through-hole 29a and the second through-hole 29b are removed. Thereafter, as shown in FIG. 5, the slit 31 is opened by means of the fastener 33, thereby connecting the first through-hole 29a and the second through-hole 29b to form a large opening. Then, the cover main body 29 is shifted in a direction in which the shaft section 23a of the ball shank 23 is extracted from this opening. By doing so, the boot seal 27 can be removed from the ball joint 19, as shown in FIG. 6.

In this case, the boot seal 27 can be removed from the ball joint 19 merely by opening the slit 31, without having to remove the shaft section 23a of the ball shank 23 from the drive link 15 or the movable plate 9, because the two through-holes 29a and 29b are connected by means of the slit 31. Therefore, the boot seal 27 can be removed without having to take much time or use a tool.

Subsequently, when a new boot seal 27 is to be attached to the ball joint 19, the slit 31 is opened by means of the fastener 33, thereby connecting the first through-hole 29a and the second through-hole 29b to form an opening. Then, as shown in FIG. 5, the cover main body 29 is placed via the opening formed by the opened slit 31 over the area in which the linking portion between the shaft section 23a of the ball shank 23 and the ball-receiving section 21b of the holder 21 is exposed.

Then, as shown in FIGS. 2 and 4, the slit 31 is hermetically closed by means of the fastener 33, thereby covering the gap between the ball shank 23 and the holder 21 with the cover main body 29 in a state in which the shaft section 23a of the ball shank 23 passes through each of the first through-hole 29a and the second through-hole 29b. Finally, the first through-hole 29a and the second through-hole 29b are hermetically closed with the hermetically closing members.

Therefore, also in this case, it is not necessary to detach the shaft section 23a of the ball shank 23 from the drive link 15 or the movable plate 9. Thus, the new boot seal 27 can be mounted on the ball joint 19 without having to take much time or use a tool.

In other words, according to the boot seal 27 and the parallel link robot 1 of this embodiment, it is possible to omit the work of disassembling and assembling the ball joint 19, thereby allowing the boot seal 27 to be retrofitted or replaced without having to take much time or use a tool. Furthermore, it is also possible to prevent the entry of dust and moisture into the gap between the ball shank 23 and the holder 21 and to hold a lubricant, such as grease, more reliably.

In addition, a compact configuration can be achieved, compared with the case where the cover main body 29 covers the entire holder 21 of the ball joint 19. In addition, the gap between the second through-hole 29b and the holder 21 can be easily hermetically closed with a hermetically closing member 32b, such as a binding band or a wire, by attaching the second through-hole 29b of the cover main body 29 to the ring-shaped stepped section 21c of the holder 21.

Figure 7:
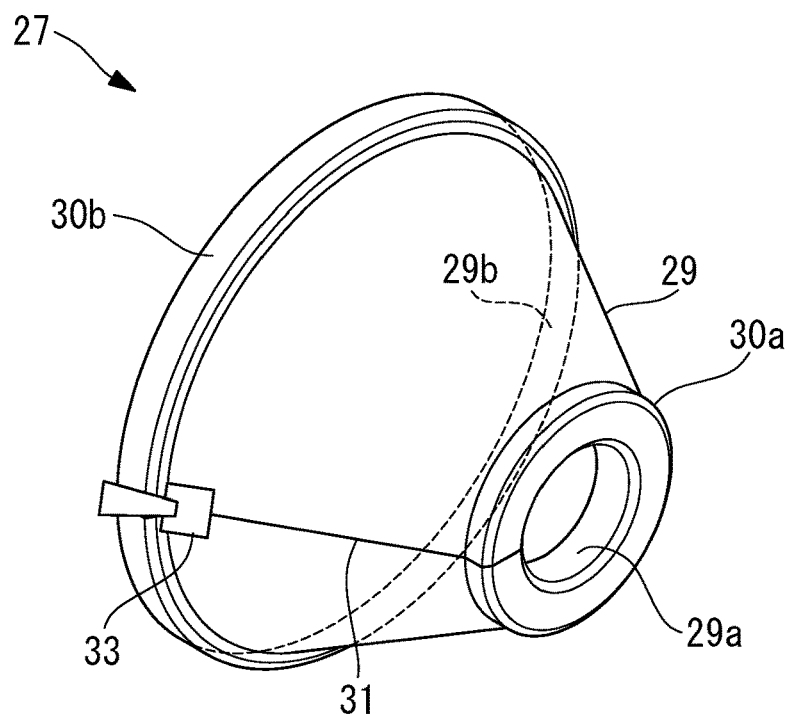
FIG. 7 is a perspective view showing one example of a boot seal according to a modification of one embodiment of the present disclosure.

In this embodiment, the cover main body 29 is shaped such that the first through-hole 29a side is curved inwardly in the radial direction. Instead of this, as shown in, for example, FIG. 7, the cover main body 29 may be shaped like a cone that becomes narrower, i.e., tapered, from the second through-hole 29b towards the first through-hole 29a in a state in which the slit 31 is closed.

This embodiment can be modified into the following configurations.

This embodiment has been described by way of an example where the boot seal 27 is configured such that the second through-hole 29b is arranged on the stepped section 21c of the holder 21 in a state in which the shaft section 23a of the ball shank 23 passes through the second through-hole 29b. Instead of this, as shown in, for example, FIG. 8, the boot seal 27 may be configured such that the second through-hole 29b is arranged on an end section of each of the link members 17a and 17b in a state in which each of the link members 17a and 17b passes through the second through-hole 29b. The configuration of a boot seal 27 according to the present modification will be described in detail.

Figure 8:
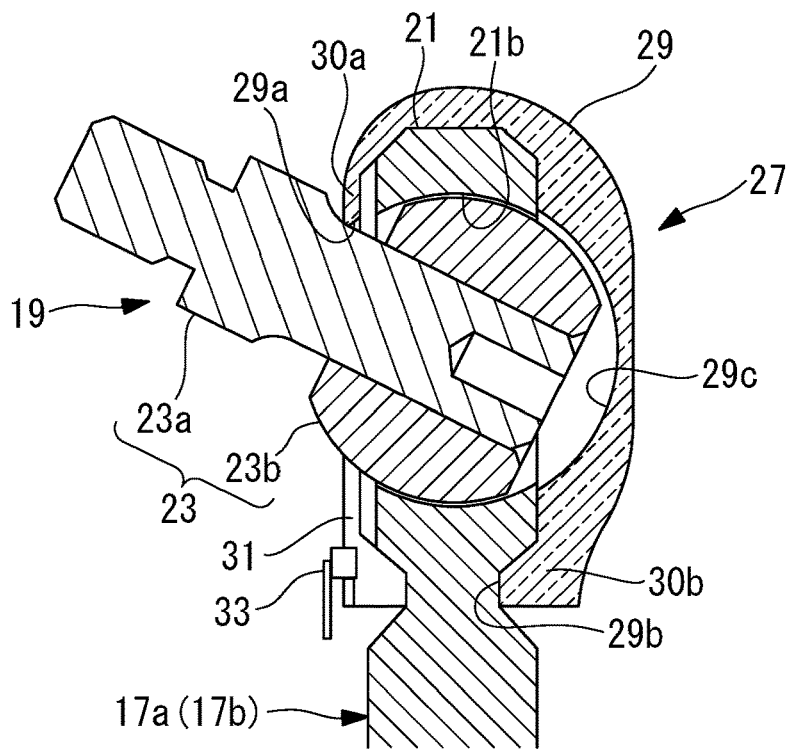
FIG. 8 is a longitudinal sectional view showing a state in which a boot seal according to another modification of one embodiment of the present disclosure is attached to the ball joint.
Figure 9:
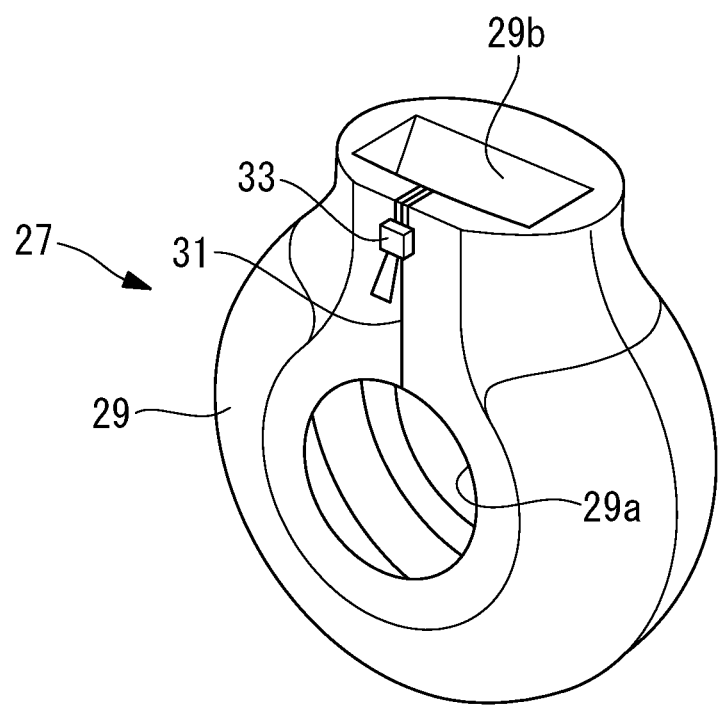
FIG. 9 is a perspective view of the boot seal in FIG. 8.

As shown in FIGS. 8 and 9, in the boot seal 27 according to the present modification, the cover main body 29 is shaped like a hollow disc that includes an inner space capable of housing the holder 21. The first through-hole 29a passes through the cover main body 29 at a surface on one axial side thereof, and the shaft section 23a of the ball shank 23 passes through the first through-hole 29a. The second through-hole 29b passes through in the radial direction at one location in the circumferential direction of the cover main body 29, and each of the link members 17a and 17b passes through the second through-hole 29b. The diameter of the first through-hole 29a is roughly set to a dimension with which the first through-hole 29a comes into slight contact with the external surface of the shaft section 23a when the ball shank 23 is arranged on the outermost periphery of the operating area thereof.

The slit 31 is shaped like a line extending in the radial direction from the first through-hole 29a and reaching the second through-hole 29b.

The fastener 33 opens and closes the slit 31 so that the slit 31 can be hermetically closed along the entire length thereof. In a state in which the slit 31 is closed by means of the fastener 33, the first through-hole 29a and the second through-hole 29b are separated from each other. On the other hand, when the slit 31 is opened by means of the fastener 33, the first through-hole 29a and the second through-hole 29b are connected to each other, thereby forming a single large opening.

As shown in FIG. 8, the boot seal 27 according to the present modification may include a recessed section 29c, formed by recessing an inner wall surface constituting the cover main body 29, on the opposite side of the inner space from the first through-hole 29a. The recessed section 29c readily gathers abrasion powder generated due to friction between the ball section 23b and the ball-receiving section 21b. In addition, the cover main body 29 may be formed of a transparent or translucent flexible material. The cover main body 29, made transparent or translucent, allows any generated abrasion powder to be visually checked from outside through the cover main body 29.

The operation of the boot seal 27 and the parallel link robot 1 according to the present modification will be described below.

As shown in FIG. 8, according to the boot seal 27 with the above-described configuration, each of the ball joints 19, including the contact portion between the ball section 23b and the ball-receiving section 21b, is covered with the cover main body 29 in a state in which the slit 31 is hermetically closed by means of the fastener 33.

Also in the present modification, as a result of the slit 31 being closed by means of the fastener 33, it is possible to prevent the slit 31 from opening even if the cover main body 29, which is formed of a flexible material, is bent or twisted. By doing so, even without the cover member 25, it is possible not only to prevent the entry of dust and moisture from outside into the gap between the ball section 23b of the ball shank 23 and the ball-receiving section 21b of the holder 21 but also to prevent the outflow of abrasion powder from the gap.

When the boot seal 27 is to be replaced, the slit 31 is opened by means of the fastener 33, thereby forming a single large opening by connecting the two through-holes 29a and 29b, and then the cover main body 29 is shifted in a direction in which the holder 21 is extracted from the inner space of the cover main body 29. By doing so, the boot seal 27 can be removed from the ball joint 19 by moving the shaft section 23a of the ball shank 23, the shaft section 23a being rested in the first through-hole 29*a*, towards the second through-hole 29*b* side via the slit 31.

Subsequently, when a new boot seal 27 is to be attached to the ball joint 19, the slit 31 is opened by means of the fastener 33, and the above-described procedure is reversed, thereby moving the shaft section 23*a* of the ball shank 23 into the first through-hole 29*a* via the opened slit 31. When the shaft section 23*a* is moved into the first through-hole 29*a*, the holder 21 is housed in the inner space of the cover main body 29. By hermetically closing the slit 31 by means of the fastener 33, the gap between the ball shank 23 and the holder 21 is covered with the cover main body 29.

According to the boot seal 27 of the present modification, similarly to the configuration of the above-described present embodiment, it is possible to omit the work of disassembling and assembling the ball joint 19, thereby allowing the boot seal 27 to be retrofitted or replaced without having to take much time or use a tool. Furthermore, even without using the cover member 25, it is possible not only to prevent the entry of dust and moisture into the gap between the ball shank 23 and the holder 21 but also to prevent the outflow of abrasion powder from the gap.

Also in the present modification, the gap between the first through-hole 29*a* and the shaft section 23*a* of the ball shank 23 and the gap between the second through-hole 29*b* and the end section of each of the link members 17*a* and 17*b* may be hermetically closed with hermetically closing members 32*a* and 32*b*, such as a binding band or a wire.

With this configuration, it is possible to secure water tightness of the gap between the ball shank 23 and the holder 21. Therefore, it is possible to prevent the outflow of abrasion powder from the gap between the ball section 23*b* of the ball shank 23 and the ball-receiving section 21*b* of the holder 21 and to reliably hold a lubricant, such as grease.

The above-described one embodiment and the modification thereof have been described by way of an example where the fastener 33 is used as the opening/closing member. Instead of this, the opening/closing member may be realized by a rail fastener that can open and close the slit 31 such that the slit 31 is hermetically closed, for example, by bringing a pair of resin, elastically deformable sections consisting of a protruding section and a recessed section that extend along the slit 31 into close contact with each other and is opened by separating the pair of sections from each other. Alternatively, hook-and-loop fasteners, such as VELCRO Tape®, that are bonded with each other when brought into contact with each other may be employed.

The invention claimed is:

1. A boot seal that is detachably attached to a robot joint comprising:
a first joint member and a second joint member; and a ball joint for linking the first joint member and the second joint member so as to be rotatable or swivelable,
wherein the ball joint comprises a ball shank having a shaft section fixed to the first joint member and a ball section provided at one end of the shaft section and a holder that is fixed to an end section of the second joint member and that has a ball-receiving section for supporting the ball section in a state in which the ball-receiving section surrounds the ball section, and
the boot seal includes a cover main body that is formed of a flexible material and that covers a gap between the ball shank and the holder, the cover main body comprising a first through-hole through which the shaft section is made to pass, a second through-hole through which the shaft section or the second joint member is made to pass, a slit that continuously extends between the first through-hole and the second through-hole and that can be opened and closed, and an opening/closing member for opening and hermetically closing the slit along an entire length thereof, said opening/closing member configured to be movable along the entire length of the slit and configured to open and hermetically close the slit by moving along the entire length of the slit.

2. The boot seal according to claim 1, wherein the first through-hole is arranged on the shaft section, and the second through-hole is arranged around an opening of the ball-receiving section in the holder, the shaft section protruding from the opening.

3. The boot seal according to claim 2, further comprising a hermetically closing member for the second through-hole, the hermetically closing member hermetically closing a gap between the second through-hole and the holder.

4. The boot seal according to claim 1, wherein the first through-hole is arranged on the shaft section, and the second through-hole is arranged on the end section of the second joint member.

5. The boot seal according to claim 4, further comprising a hermetically closing member for the second through-hole, the hermetically closing member hermetically closing a gap between the second through-hole and the end section of the second joint member.

6. The boot seal according to claim 2, further comprising a hermetically closing member for the first through-hole, the hermetically closing member hermetically closing a gap between the first through-hole and the shaft section.

7. The boot seal according to claim 4, further comprising a hermetically closing member for the first through-hole, the hermetically closing member hermetically closing a gap between the first through-hole and the shaft section.

8. The boot seal according to claim 1, wherein the opening/closing member comprises a fastener.

9. A robot comprising a plurality of joints, wherein a boot seal comprising a first joint member and a second joint member; and a ball joint for linking the first joint member and the second joint member so as to be rotatable or swivelable,
wherein the ball joint comprises a ball shank having a shaft section fixed to the first joint member and a ball section provided at one end of the shaft section and a holder that is fixed to an end section of the second joint member and that has a ball-receiving section for supporting the ball section in a state in which the ball-receiving section surrounds the ball section, and
the boot seal includes a cover main body that is formed of a flexible material and that covers a gap between the ball shank and the holder, the cover main body comprising a first through-hole through which the shaft section is made to pass, a second through-hole through which the shaft section or the second joint member is made to pass, a slit that continuously extends between the first through-hole and the second through-hole and that can be opened and closed, and an opening/closing member for opening and hermetically closing the slit along an entire length thereof, is attached to at least one of the plurality of joints, said opening/closing member configured to be movable along the entire length of the slit and configured to open and hermetically close the slit by moving along the entire length of the slit.

10. A parallel link robot comprising:
a base to which a plurality of actuators are attached;
a plurality of arms linked to the respective actuators;
and an end part attached to leading ends of the arms, wherein each of the arms includes a drive link that is driven by the corresponding actuator and a passive link arranged between the drive link and the end part, the parallel link robot includes the boot seal according to claim 1 and a plurality of ball joints for connecting the passive link to the drive link and the passive link to the end part, said plurality of ball joints including the ball joint for linking the first joint member and the second joint member, the first joint member is at least one of the drive link and the end part, and the second joint member is the passive link.

* * * * *